(12) United States Patent  (10) Patent No.: US 8,477,140 B2
Smith et al.  (45) Date of Patent: Jul. 2, 2013

(54) CREATING CHARACTER FOR ANIMATION

(75) Inventors: Jason Smith, San Rafael, CA (US); Jeff White, San Rafael, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 987 days.

(21) Appl. No.: 11/738,714

(22) Filed: Apr. 23, 2007

(65) Prior Publication Data

US 2008/0012847 A1    Jan. 17, 2008

Related U.S. Application Data

(60) Provisional application No. 60/807,041, filed on Jul. 11, 2006.

(51) Int. Cl.
 *G06T 13/00* (2011.01)
 *G06T 17/00* (2006.01)

(52) U.S. Cl.
 USPC .......................................... 345/474; 345/420

(58) Field of Classification Search
 None
 See application file for complete search history.

(56) References Cited

U.S. PATENT DOCUMENTS

| | | | |
|---|---|---|---|
| 6,204,860 B1 * | 3/2001 | Singh | 345/420 |
| 6,400,368 B1 * | 6/2002 | Laperriere | 345/473 |
| 6,535,215 B1 * | 3/2003 | DeWitt et al. | 345/473 |
| 7,202,869 B2 | 4/2007 | Tooley et al. | |
| 2003/0184544 A1 * | 10/2003 | Prudent | 345/419 |
| 2004/0021660 A1 * | 2/2004 | Ng-Thow-Hing et al. | 345/419 |
| 2005/0026685 A1 * | 2/2005 | Ruark et al. | 463/31 |
| 2007/0024632 A1 * | 2/2007 | Couture-Gagnon | 345/581 |

OTHER PUBLICATIONS

'Skeletal Animation'[Online]. Wikipedia, [retrieved on Jul. 6, 2009] [Published on Oct. 11, 2006]. Retrieved from the Internet: http://web.archive.org/web/20061011232200/http://en.wikipedia.org/wiki/skeletal_animation.

Baran, Ilya, and Popovic, Jovan, 'Automatic Rigging and Animation of 3D Characters' Computer Science and Artificial Intelligence Laboratory Massachusetts Institute of Technology, [Published Aug. 24, 2007] pp. 1-8.

* cited by examiner

*Primary Examiner* — Carlos Perromat

(74) *Attorney, Agent, or Firm* — Kilpatrick Townsend & Stockton LLP

(57) ABSTRACT

A computer-implemented method for creating a character for an animation includes modifying a first polygonal geometric structure, having a specific form, to generate a second polygonal geometric structure having another form. The first polygonal geometric structure is associated with a definition of multiple points relative to vertices on the first polygonal geometric structure. The method includes transforming the definition, in multiple progressive refinements, to generate a transformed definition for the second polygonal geometric structure. The method includes storing the transformed definition in association with the second polygonal geometric structure, the transformed definition to be used in generating a geometry for the second polygonal geometric structure. A system includes a character component management module, a transforming module and a database.

27 Claims, 7 Drawing Sheets

US 8,477,140 B2

CREATING CHARACTER FOR ANIMATION

CROSS-REFERENCE TO RELATED APPLICATION

This application claims priority from pending provisional patent application Ser. No. 60/807,041, entitled "Creating Character for Animation" and filed on Jul. 11, 2006, the entire contents of which are incorporated herein by reference.

TECHNICAL FIELD

This document relates to creating a character to be used in an animation.

BACKGROUND

The process of setting up a character for animation in computer graphics is often intricate and time-consuming. For example, setup of a character skeleton and the corresponding deformation thereof have typically been approached from the inside out. This means that the setup artist typically places all of the joints within the skin, runs a script and then continues to place additional features by hand. To do this by hand means that the artist manipulates the digital entities representing these features using the input device of a computer (e.g., a mouse or track pad). Then, the artist may perform muscle setup by hand in a similar way. When the character is finished, it will be used as a tool in providing the successively changing appearance of the character in generating the animation.

With increasing complexity of animation, the work needed for character setup increases significantly, sometimes by several orders of magnitude or more. This is because complicated animation features such as sliding skin and muscle deformations require progressively greater amounts of time in setting up the character. Also, rigging of the character typically involves building a single hierarchy of nodes to represent the motion that drives the character. These rigs usually are not flexible and do not allow a convenient way of making rapid changes to the character structure, for example in response to feedback from directors or animators on the project.

SUMMARY

The invention relates to creating a character for animation. For example, it is shown that positional representations relating to the character shape can be modified in multiple progressive refinements.

In a first general aspect, a computer-implemented method for creating a character for an animation includes modifying a first polygonal geometric structure, having a specific form, to generate a second polygonal geometric structure having another form. The first polygonal geometric structure is associated with a definition of multiple points relative to vertices on the first polygonal geometric structure. The method includes transforming the definition, in multiple progressive refinements, to generate a transformed definition for the second polygonal geometric structure. The method includes storing the transformed definition in association with the second polygonal geometric structure, the transformed definition to be used in generating a geometry for the second polygonal geometric structure.

Implementations may includes any or all of the following features. The progressive refinements may include at least two of: a first transformation based on the second polygonal geometric structure in its entirety; a second transformation based on a local region of the second polygonal geometric structure; and a third transformation on a vertice-by-vertice basis. The progressive refinements may include at least two of: a global scale match transformation correlated to the second polygonal geometric structure; a single transform for each of the multiple points to relate the definition to the second polygonal geometric structure; and a transformation matching of individual ones of the multiple points to corresponding vertices on the first polygonal geometric structure. When the transformation matching is performed, the transformation matching may include a matching of rotation, translation and scale based on the vertices on the first polygonal geometric structure. The method may further include performing a setup of the first polygonal geometric structure before generating the second polygonal geometric structure. The setup may include creating the first polygonal geometric structure by assembling several geometry pieces. The setup may include providing the first polygonal geometric structure with skin weighting and muscle representations. The setup may include creating the definition of the multiple points, including associating at least one of the vertices on the first polygonal geometric structure with each of the multiple points. The setup may include shaping the first polygonal geometric structure to the specific form, the specific form selected to match a character geometry. The setup may include providing the first polygonal geometric structure with a modular rig structure comprising several blocks. The setup may further include providing the first polygonal geometric structure with spatial variables capable of defining a configuration of the modular rig structure. The method may further include setting new values of the spatial variables for the second polygonal geometric structure by identifying, in the first polygonal geometric structure, those vertices with which each spatial variable is associated, obtaining new positions of the vertices in the second polygonal geometric structure, and setting the new values of the spatial variables using the new positions. The new values may be set by deriving a transformation matrix using the first and second polygonal geometric structures and applying the transformation matrix to the spatial variables. The method may further include also processing at least one of the spatial variables in the progressive refinements. Each of the blocks may be associated with three functions that can be performed in providing the second polygonal geometric structure with the modular rig structure: (i) a first function that lists those of the spatial variables that are to be applied to the current block for retrieving those spatial variables for the current block; (ii) a second function that identifies at least one of the spatial variables associated with another one of the blocks, wherein the current block is to use the identified spatial variable in connecting to the other block; and (iii) a third function that identifies at least one of the spatial variables associated with the current block, wherein another one of the blocks is to use the identified spatial variable in connecting to the current block. The rig structure may be modular due to the blocks being configured to be associated in pairs using plug definitions and socket definitions associated with respective ones of the blocks. The several blocks may be organized in a flat hierarchy, and the method may further include collapsing each plug-socket relationship into a direct relationship between those of the blocks having the respective plug definitions and socket definitions. The plug and socket definitions may include unique identifiers, and a first one of the blocks may be connected to a second one of the blocks only if a plug definition for the first block has a common identifier with a socket definition for the second block. The first and second polygonal geometric structures may be at least in part left-right symmetrical, further comprising organizing the blocks in respective left side and right side categories. The first block may be organized in the right side category, and seeking a match for the first block may include searching the right side category for another block having the common identifier. The setup may include identifying vertices on a left side of the first polygonal geometric structure that are equivalent to vertices on a right side of the first polygonal geometric structure, and the method may further include using this equivalency when providing the spatial variables. Using the equivalency may include mapping the spatial variables for the equivalent vertices. The several blocks may be obtained from a kit that has been associated with the first polygonal geometric structure. The method may further include using the first and second polygonal geometric structures to create a combined polygonal geometric structure. Each of the first and second polygonal geometric structures may have a modular rig structure including several blocks, and the combined polygonal geometric structure may be created by obtaining selected blocks from the respective modular rig structures and assembling the selected blocks. The method may further include performing another progressive-refinement transformation in creating the combined polygonal geometric structure. Each of the progressive refinements may include at least one of a scale transformation, a rotation and a translation. A first one of the progressive refinements may include only the scale transformation.

In a second general aspect, a system for creating a character for an animation includes a character component management module for modifying a first polygonal geometric structure, having a specific form, to generate a second polygonal geometric structure having another form. The first polygonal geometric structure is associated with a definition of multiple points relative to vertices on the first polygonal geometric structure. The system further includes a transforming module transforming the definition, in multiple progressive refinements, to generate a transformed definition for the second polygonal geometric structure. The system includes a database for storing the transformed definition in association with the second polygonal geometric structure. The transformed definition is to be used in generating a geometry for the second polygonal geometric structure.

Implementations may include any or all of the following features. The modifying module may further set up the first polygonal geometric structure by providing it with a modular rig structure comprising several blocks, and provide it with spatial variables capable of defining a configuration of the modular rig structure. The modifying module may use a left-right symmetry in providing the first polygonal geometric structure with the modular rig structure or the spatial variables. The blocks may be organized in a kit that is associated with the first polygonal geometric structure.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
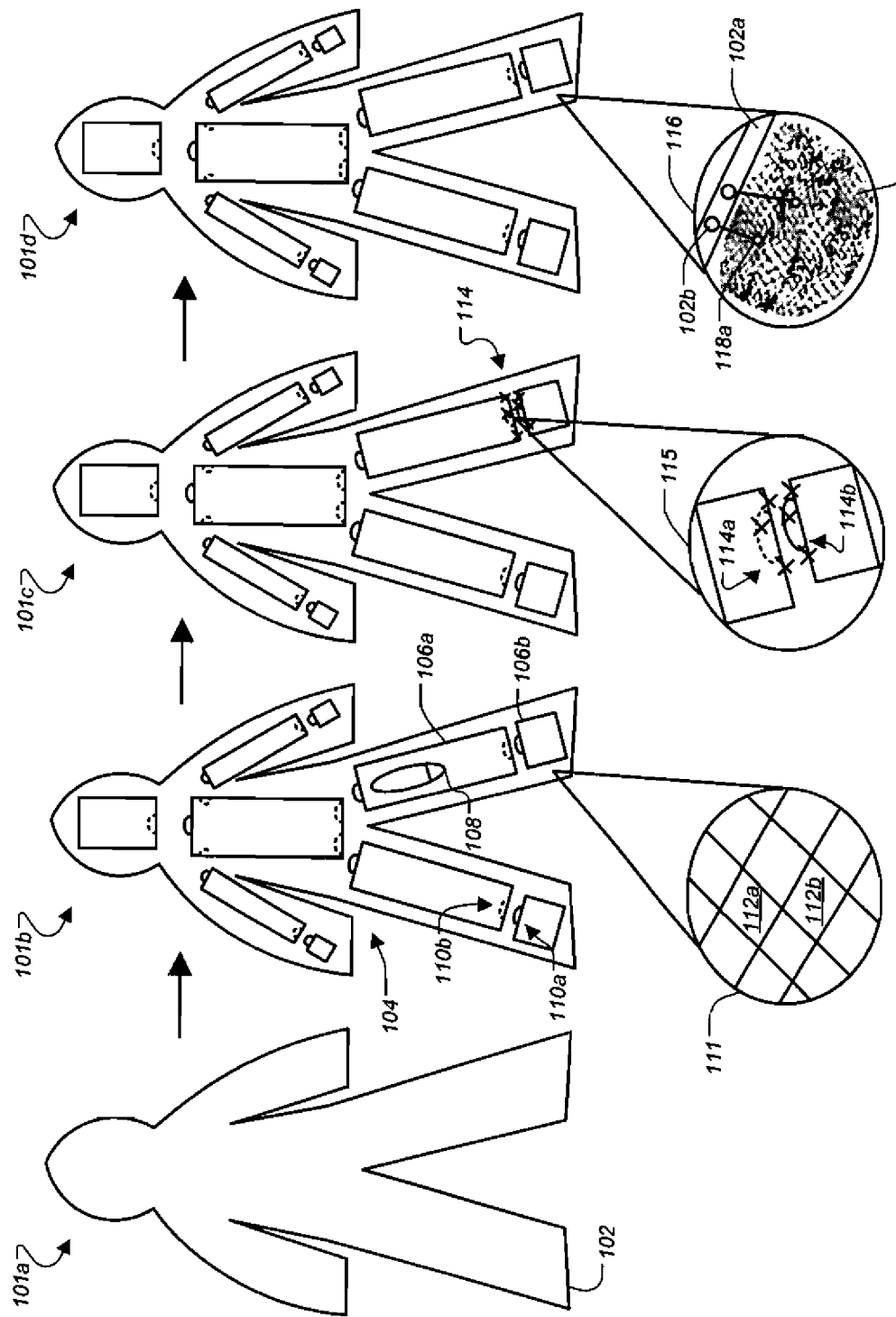
FIG. 1 schematically shows an example of processing a volume guide for a character.

FIG. 1 schematically shows an example of creating a character that can be used in an animation. The creation is performed in a computer-based process 100 that involves stages of defining, or gathering, the various components that are to make up the character and assembling them together into a finished version. This approach allows for a convenient and time-efficient character creation, and may also allow great flexibility in later adapting the created character for a different purpose.

The process 100 operates on a character 101 and, in so doing, provides the character with the components needed to obtain the finished version. The process 100 may be performed in a setup situation, where it is used to create the character 101 without using any already existing character. In such a situation, a user may be doing the various steps by hand, meaning that the user instructs the computer where to place character components, for example. The process 100 may also be used in a character reuse situation, where the new character is generated using an existing character. In such an example, some or all of the process may be fully automated, meaning that it can be performed without specific prompting by the user.

The process may begin with creating what will here be referred to as a volume guide 102 for the character 101*a*. The volume guide is created by combining pieces of computer-based geometry—that is, digital representations of three-dimensional surfaces or structures—that are assembled into the desired shape. The volume guide is a polygonal geometric structure forming a digital mesh that will later be used for precisely placing various features of the character to define their position or movement in the three-dimensional space.

The volume guide 102 can be modified or otherwise manipulated, using a computer, to represent an arbitrary shape. Here, the volume guide has been provided with the approximate shape of a biped, which makes it useful in situations when the character to be created is a human or a gorilla, for example. A volume guide is not limited to bipeds, however, but rather can be shaped into virtually any other character type including a horse, a cat or a centaur, to name a few examples.

Next, the process 100 may generate the character 101*b* by providing a modular rig structure 104 for the volume guide 102. The modular rig structure may, in a sense, constitute a "skeleton" for the character and can be used for controlling the appearance of the character when at rest, as well as the movements that the character can perform. The modular rig structure is made up of several blocks 106 that are to be assembled into the particular rig needed for the character that is being created. For example, the modular rig structure may include a leg 106*a* forming an ankle at its lower end where a foot 106*b* is configured to be connected. While the blocks 106 are here schematically shown as rectangular geometric shapes, they are arbitrary collections of rigging for the character. The blocks may be considered containers that have no geometric representation; rather they can contain references (e.g., in form of a script) to other character components, such as those that define locations or geometry and will be described later. For example, upon being set up, the blocks can cause one or more muscles 108 to be provided to the character 101b.

The rig structure 104 is modular, meaning that various blocks can be connected together to correspond to the desired shape of the character being created. The blocks are logical units that represent some portion or aspect of the whole character, such as a hand, arm or an eye, or a functional feature such as an animation geometry. In this schematic example, the rig for the character 101b is shown to be assembled from blocks that correspond to the normal torso, head and extremities of a biped. For a different type of volume guide, such as a horse or a cat, different collections of blocks may be used as appropriate. The contents of each block can be arbitrarily defined when it is being created, and below will be described an example of a standard set of functions that may be used to instruct the computer that is working with the character how to use the block.

The modularity of the rig structure 104 is here facilitated by what will be referred to as a plug-and-socket approach. Each block is associated with at least one plug or socket that can be used in connecting that block to a corresponding block. For example, a foot block may be provided with a plug definition 110a that matches a socket definition 110b of a leg block. This is an identity-based approach in which the system can automatically evaluate the plugs or sockets of several or all blocks and based on that evaluation select the proper blocks to be connected. In one implementation, the plug and socket definitions may have numerical identities. Then, the foot block and the leg block will be connected together only if their respective plug and socket definitions have a common identifier (e.g., "47"). Another approach is to use non-arbitrary identifiers (e.g., descriptive identifiers) such as "arm_joint" and "chest_joint", with a definition that the "arm_joint" is parented under the "chest_joint".

The process 100 may provide skin weighting. This may be done by selectively providing the outer surface of the volume guide 102 with different weights in particular areas to define how a "skin" of the character is to appear or behave. For example, the skin weights may be associated with the respective vertices that make up the mesh of the volume guide. The skin weights may be numerical factors or any other types of weights, and they may be applied over the entire area of the outer surface or only selected portions thereof For example, a detail 111 of the character 101b schematically illustrates two skin portions 112a and 112b that can be provided with (the same or different) skin weights.

The process 100 also creates what will here be referred to as signposts 114, as schematically illustrated in one area of the character 101c. The signposts are spatial variables that can be assigned appropriate values to define a particular configuration of the modular rig structure 104. As such, the signposts constitute spatial representations of the features in the rig that are to be automatically placed. The signposts do this by recording positions in three-dimensional space relative to the volume guide. Signposts can represent the position for the shoulder joint of the biped, or which direction the fingers should move, to name just two examples. Here, a detail 115 of the character 101c schematically illustrates that signposts 114a have been associated with the socket of the leg block 106a, and signposts 114b with the plug of the foot block 106b. The signposts can be used to place the plug and socket that define aspects of this connection such as where the joint is and how it can be moved, to name some examples. Similarly, signposts can be defined for, and applied to, any or all other areas of the character. The signposts may have unique identifiers and be stored in a database with the other character components. Also, a set of vertices from the volume guide may be selected, for each signpost, and the vertices' mesh names, index numbers and world space coordinates may be recorded and associated with the corresponding signpost.

Signpost generation for any aspect of the rig structure 104, such an arm, may proceed as in the following example. First, an executable script may be provided that describes how the computer should generate the arm. Second, this script can then be followed in a number of situations where arms (identical or different) should be created. Third, the created arms may be stored in a database for reuse in another project. Particularly, each block (e.g., the arm) may have one or more standard functions to be used when the arm is drawn in the computer. A first example of such a function is the automatic listing of those of the signposts that are to be applied to the arm block. This function, when executed, may trigger the computer to retrieve each of the listed signposts from the database and position it in the proper place with respect to the volume guide. A second example of such a function is the importing of one or more signposts defining the position of a plug or socket of another block, which plug or socket the arm block will use in connecting to the other block. For example, this function can identify a socket for the torso block representing the chest joint where the arm is to be connected. A third example of such a function is the importing of one or more sockets for the arm block, which socket(s) another block will use in connecting to the arm block. For example, this function can identify a wrist socket provided by the arm block that is to be connected to a plug of a hand block. One advantage of such implementations is that the function is defined separately from the location.

The process 100 also provides geometry sets, here referred to as geomsets, to the character for use in generating its geometry. The geomsets define multiple points relative to the vertices of the mesh that makes up the volume guide 102. As such, the geomset is a positional representation in three-dimensional space relative to the locations of the mesh vertices. The geomsets are collections of points that are recorded relative to the volume guide for use in geometry generation for the volume guide. For example, a detail 116 of the character 101d schematically illustrates a geomset 118. Here, the geomset 118 is defined relative to a mesh 102a of the volume guide 102 (the mesh here illustrated in cross-section for clarity). Particularly, the geomset in this example includes one or more points 118a recorded in relation to a vertex 102b in the mesh 102a.

Any collection of geometry that can be defined as having a spatial relationship with a volume guide can be used as the geomset 118. Geomsets can be used for different purposes. For example, a volume guide that includes a human head may have a skull and a jaw that are represented by geomsets. Each point of these geomsets is then assigned to one of the vertices on the volume guide. To later generate a gorilla character, the geomsets are automatically adapted according to the new location of the reference vertices on the gorilla volume guide. Another example is that clothing or other accessories on a character can be provided using geomsets. Yet another example is to use geomsets in defining collision geometry for a character or clothing.

Thus, the process 100 can generate the character 101d to be stored in a database for use in one or more animations. In some situation, this is a setup procedure and in others it is a reuse of an existing character. Upon performing such animation(s), the various character components can be used along the lines that have been indicated above. For example, the rig structure through the assigned signposts affects the size and movement of the character, while the geomsets can be used in defining its geometry. The generated character may be used in different ways for the animation. For example, the character can be used as an animation low-resolution geometry for some aspects of an animation, while a high-resolution mesh is to be used in the computer-based rendering that generates actual images for the animation.

Figure 2:
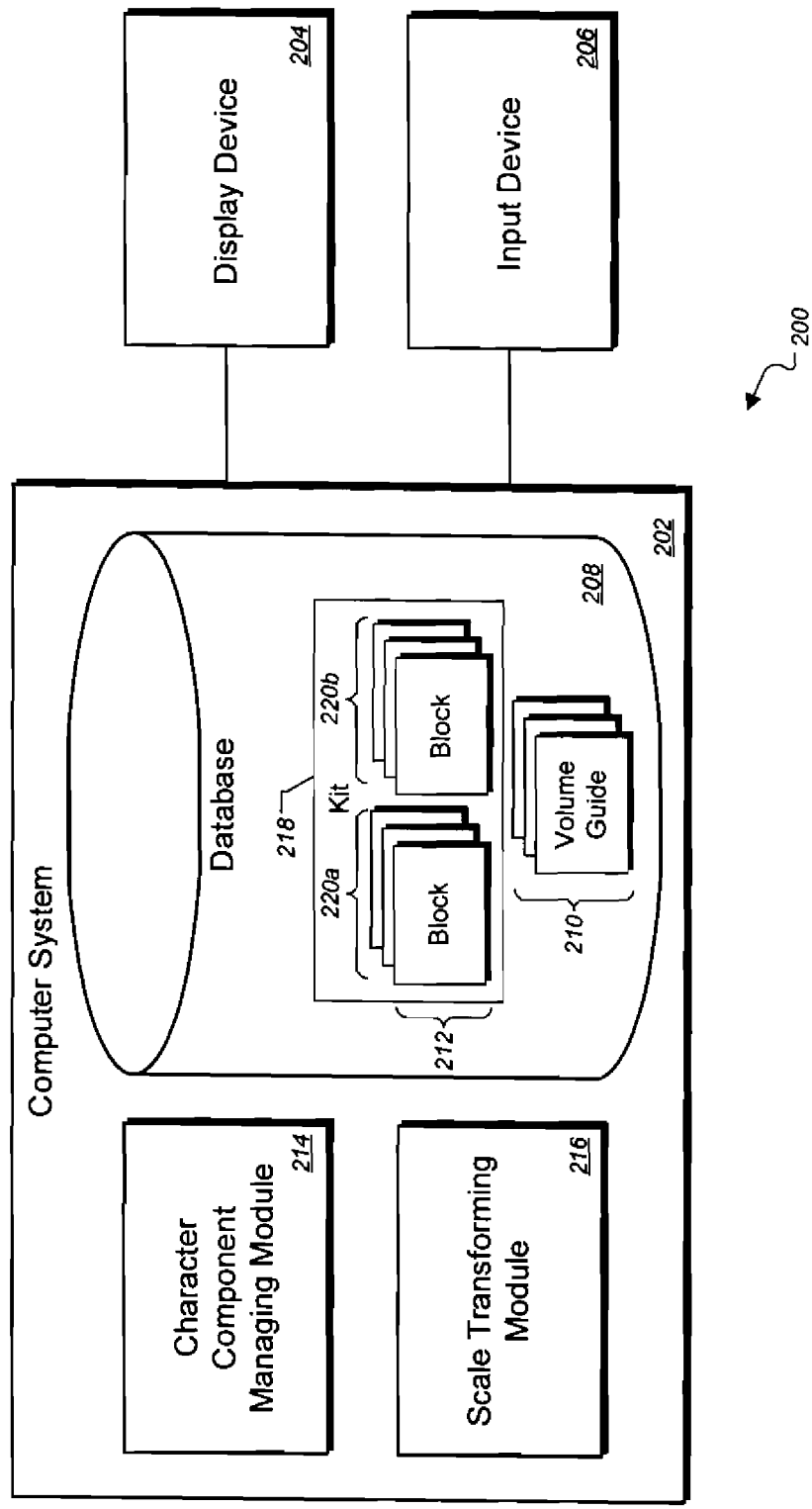
FIG. 2 shows an example of a block diagram of a system.

There will now be described an example of a system that can perform the process 100 or other operations relating to character creation. FIG. 2 shows a block diagram of a system 200 for creating and maintaining animation characters. The system includes a computer system 202 that can execute the instructions necessary to perform the processing as described herein. Selected outputs from the system 202 such as instructions, definitions, data or images of created characters, can be generated on a display device 204 for viewing by a user. The user can also input information into the system 202, for example to respond to instructions, create definitions, enter data or manipulate a created character, to name a few examples, with at least one input device 206.

The system 200 includes one or more databases 208 for storing character components, characters that are in the process of creation, and finished characters, to name a few examples. Here, several volume guides 210 and blocks 212 are shown stored in the database. The system can refer to the database to obtain selected ones of these components for use in creating a new character, as an example of reusing character components.

The system 200 includes a character component managing module 214 for use in performing, and thereafter storing in the database 208, one or more manipulations of character components. The module 214 can be used in changing the shape of an existing volume guide into a particular form such as a biped, horse or cat. The module 214 can be used in assigning skin weights, muscles and a rig geometry to any of the volume guides. Moreover, the module 214 can be used in creating the definitions of signposts and geomsets. In any or all of the above examples of operations performed using the module 214, one or more existing components may be reused, and this may provide a simpler and more efficient character creation.

Particularly, the system 200 includes a transforming module 216 that can be used in modifying existing geomsets or signposts, or both, for use in a new or altered character. The module 216 can transform character components, for example with respect to scale, rotation or translation. For example, the module 216 may be used to perform progressively refined transformation after a human-shaped volume guide has been reshaped into a gorilla character, to finish that gorilla character with the necessary character components. In such a process, individual character components of the human will be modified or manipulated until the resulting volume corresponds to the gorilla. Taking the bicep muscle as an example, the module 216 may first globally scale a geomset of the human volume guide based on the volume guide of the gorilla. Generally, this may increase a size of the bicep muscle. Second, the module 216 may locally transform the bicep muscle based on the corresponding region of the gorilla volume guide where the muscle is to be located. This provides a refinement of the scaling performed in the first transformation. Third, the module 216 can perform a transformation of the geomset on a vertice-by-vertice basis. This, in turn, provides a refinement of the second transformation. Thus, several progressive transformation refinements can be performed. A kit 218 in the database 208 will be described below.

Figure 3:
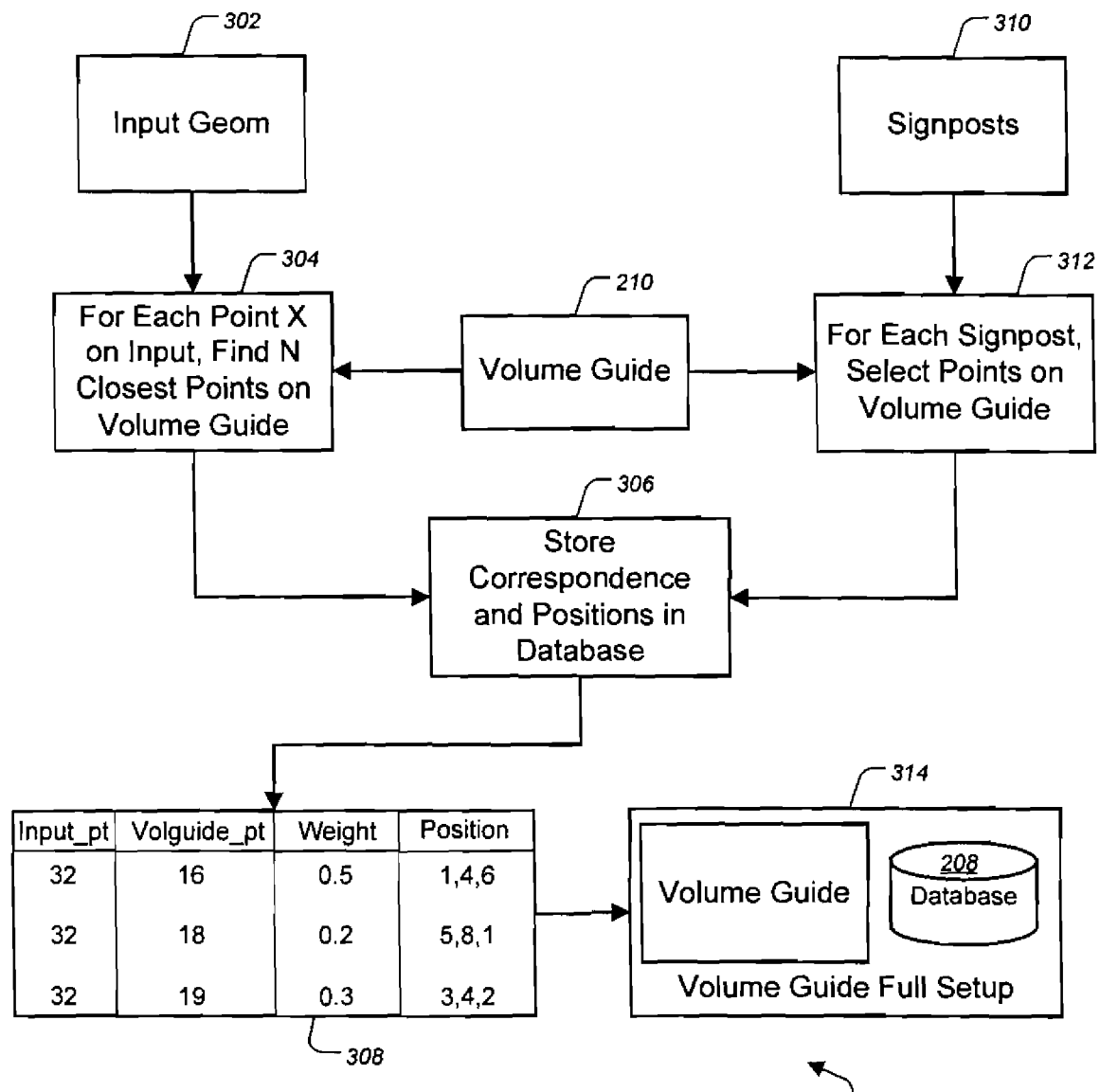
FIG. 3 shows an example of processing geomsets and signposts.

FIG. 3 shows a process 300 that can be performed in the processing of geomsets or signposts, or both. The process is computer-implemented and may be performed by executing instructions stored in a computer-readable medium, for example in the system 200. The process 300 uses a selected one of the volume guides 210 in defining the corresponding geomsets or signposts. In a step 302 one or more geomsets are input. Next, the process includes a step 304 for point-by-point processing of the geomset definition. Particularly, for each point, step 304 may identify N closest points (e.g., vertices) on the volume guide 210. The correspondence between the geomset points and the volume guide mesh, including the positions of the points, is stored in a database in step 306, for example in the database 208. Here, a correspondence and position chart 308 schematically illustrates an example of the outcome from step 306. Particularly, the chart 308 shows that an input point 32 (e.g., on the geomset) is associated with points 16, 18 and 19 on the volume guide with different weights, respectively, and the positions of the points are indicated.

In a step 310, one or more signposts are input to the process 300. For each signpost there is selected, in step 312, one or more points on the volume guide 210. In one implementation, the user can choose the volume guide points, for example while viewing a visual representation of the volume guide on the display device 204 (FIG. 2). These point correspondences, and the associated positions, are stored in the database in step 306, similarly to the processing of geomsets described above. After step 306 has been performed, a full setup 314 of the volume guide may result as the outcome and final stage of the process 300.

Figure 4:
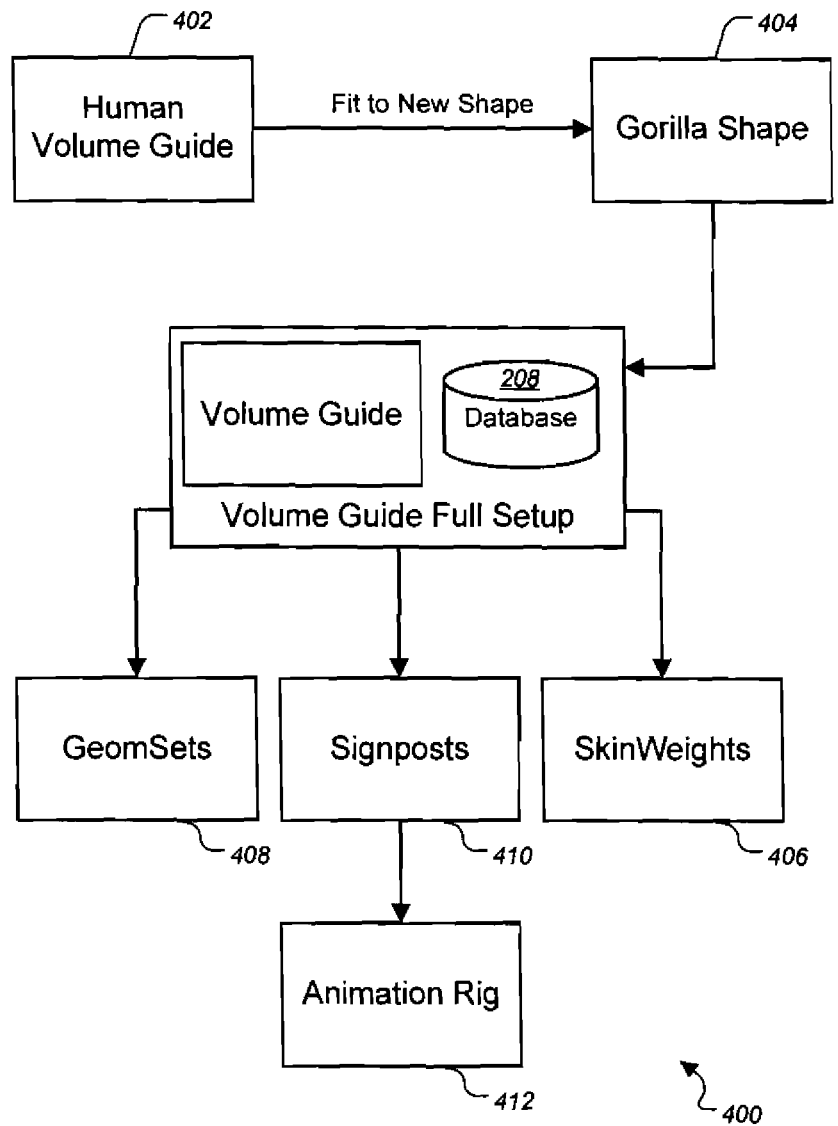
FIG. 4 shows an example of changing a human character into a gorilla character.

There will now be described an example of how a finished volume guide can be reused in the creation of a new character. FIG. 4 shows a process 400 of modifying a character having a human volume guide 402 to form a character with a new volume guide 404 having a gorilla shape. First, the volume guide 402 is fit to the new shape (i.e., the gorilla shape; this may be done by hand) and is then combined with selected information from the database 208 to generate the necessary character components. In a particular example, the gorilla shape may exist in form of a predefined character, such as one that has been defined by the authors or creators behind an animation production. In such situations, the volume guide is shaped so that its features are as close as possible to those of the predefined character geometry. For example, the user may shape an arm of the volume guide to match the arm of the gorilla character, a nose to match the gorilla nose, and so on.

Next, selected character components of the gorilla can be manipulated in one or more process steps to conform to the desired character geometry. Skin weights can be processed in step 406. This may be done similarly to the assignment of skin weights described with reference to the character 101b (FIG. 1). For example, the skin weights can be loaded point-for-point so that the new volume guide gets the same weights. Later, the skin weights can be transferred from the sculpted volume guide to a high-resolution mesh that is used for rendering the images to be shown on a screen.

Geomsets can be processed in a step 408 and signposts in a step 410. This may be done as exemplified in the process 300 (FIG. 3). For example, the geomset or the signposts may be defined relative to the gorilla volume guide. Based on the defined signposts, an animation rig 412 can be generated. The rig may be modular and may be based on reusable blocks, as has been exemplified above with regard to the modular rig structure 104 (FIG. 1). Particularly, in drawing specific rig features, the corresponding signposts may be retrieved to specify their new location. When a signpost is requested, the database may be accessed to determine the one or more vertices of the original volume guide mesh relative to which the signpost location was recorded. Then, by obtaining a new position of the identified vertex/vertices, the signpost can be moved (i.e., the spatial variable modified) accordingly. For example, this may be done by the scale transforming module 216 (FIG. 2) deriving a transformation matrix based on the original and the modified vertex positions. This matrix can then be applied to the signposts to place them in the correct locations for the modified character. Thus, there can be generated a field of transformations based on the change in shape of the volume guide. This in turn allows the system to accurately derive the placement of joints, skin deformers, collision volumes, animation geometry and muscle rigs, also when there are significant proportional changes in the animal geometry (such as in going from a horse to a boar). Also, this approach enables asymmetrical creatures to be created by storing a correspondence between volume guide vertices across a symmetry plane.

Figure 5:
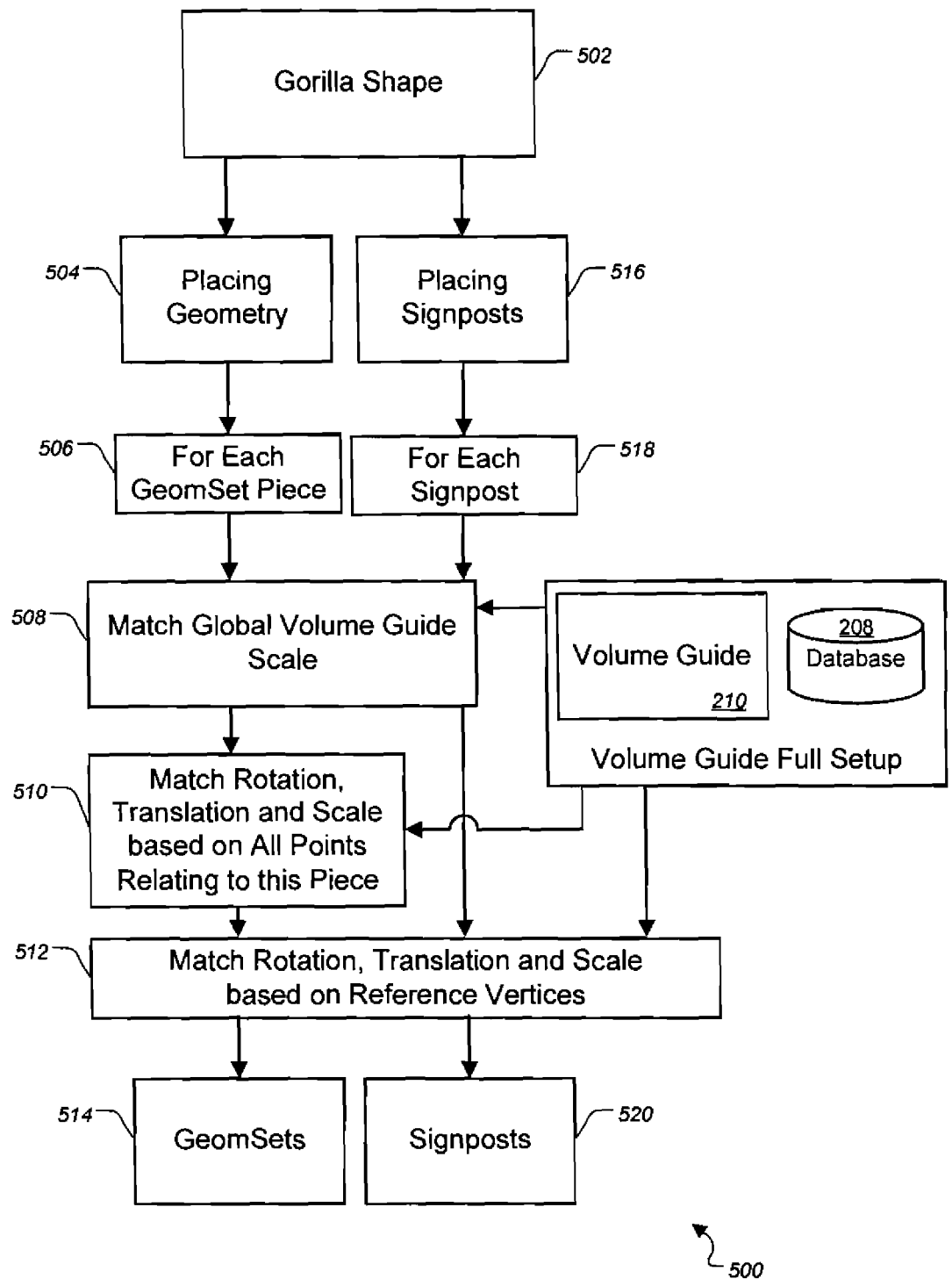
FIG. 5 shows an example of processing the geomsets and signposts of a gorilla character.

FIG. 5 shows an example of operations that can be performed to create a new character based on an existing one. A process 500 may begin in a step 502 with receiving a volume guide for a gorilla shape. For example, this may be done by the user fitting an existing human volume guide into a gorilla shape, similarly to the description of FIG. 4 above. In other implementations, the gorilla shape has been created separately and is obtained by the process 500. The volume guide may be managed by the managing module 214 (FIG. 2).

In step 504, the one or more geometry components that should be used with the gorilla are placed in the gorilla volume guide. Here, the gorilla should be provided with several geomsets so that its geometry can be generated as necessary. At this point, the geomsets are configured for the human volume guide. While some of the human geomsets may fit the gorilla character without modification, it is likely that a number of them need to be transformed to match the gorilla shape. The process 500 therefore includes a series of transformation steps to perform that transformation, and they may be performed iteratively for each piece of geomset, as indicated by an iterative step 506. For example, the geomset 118 (FIG. 1) may be one of the pieces. First, the process 500 may perform a step 508 of globally matching a scale of the geomset piece to the gorilla volume guide as a whole. Here, the gorilla volume guide 210 may be obtained from the database 208. Using the obtained volume guide, it may be determined that it is taller than the human volume guide by a factor 1.5, wider by a factor 1.3, and thicker by a factor 1.2. The step 508 would then globally scale up the geomset piece according to these factors, to name one example. Step 508 may be performed by the module 216 (FIG. 2).

The geomset piece has now been enlarged in response to the change from a human to a gorilla volume guide. This transformation does not, however, take into account the fact that, in this example, the human volume guide was not merely enlarged into a larger human character, but rather was also reshaped into the appearance of a gorilla. This means that the shape of the geomset should also be altered corresponding to this reshaping. It may be desirable to further manipulate the configuration of the geomset piece in one or more progressive refinements of the initial scale matching.

One such example is a step 510 where a transformation is performed for all the points that relate this particular geomset piece to the gorilla volume guide. For example, this transformation is based on a local region of the gorilla volume guide, such as in the vicinity of the bicep muscle. The transformation may include scaling, rotation or translation. Thus, a progressive refinement can be done by following up a global scale matching with a more regional transformation. Step 510 may be performed by the module 216 (FIG. 2).

Another such example is a step 512 where individual geomset vertices are transform matched corresponding to the vertices on the volume guide that they relate to. It was described as an example with reference to FIG. 1 that a point 118a on the geomset 118 can be associated with a vertex 102b in the mesh 102a. When the volume guide is reshaped from human to gorilla, many, if not all, of its mesh vertices may be moved into new locations to form the gorilla shape. Based on these new locations, the rotation, translation or scale of each geomset point can be modified. Accordingly, each point (or vertex) on the geomset can be transformed on a vertice-by-vertice basis. Step 512 may be performed by the module 216 (FIG. 2). Other progressive refinements can be used.

The step 512 may be performed after the step 510, as shown, and may then be considered a local progressive refinement on the regional transformation done in the previous step. In some such implementations, step 508 may be omitted. As another example, step 510 may be omitted and the step 512 may follow directly after step 508. In yet another example, step 512 may be omitted and step 510 may be performed directly after step 508. When other progressive transformations are used, different combinations may be possible. The process 500 includes storing each finished gorilla geomset in step 514.

The signposts may also be handled in the process 500. In a step 516, signposts are placed relative to the gorilla volume guide that was obtained in step 502. An iterative step 518 indicates that some processing may be done individually for each signpost. For example, the signposts may be modified in progressive refinements similar to those described above as examples for the geomsets. Here, it is illustrated that the signposts are subjected to a global scale match in step 508 and a rotation, translation or scaling in step 512. Other progressive refinements can be used for the signposts. The process 500 includes storing the finished gorilla signposts in step 520.

It has been described herein that character components can be reused in the creation of new characters. It may therefore be convenient to keep related components together, so that they are organized in a way that makes it easy for a user to obtain the parts needed for a particular project. With reference briefly again to FIG. 2, all the blocks that need to be drawn together may be collected in the kit 218. For example, the kit 218 includes all the blocks 212 that make up a biped, such as arms, hands, spine, head and legs. A user that needs to create a biped character can then request the blocks from the kit 218 and thereafter begin the process of modifying the character as in any of the above examples. The database 208 may include several kits, each of which may be geared toward a different character. The blocks in the various kits may be different, or one or more blocks can be common.

Figure 6:
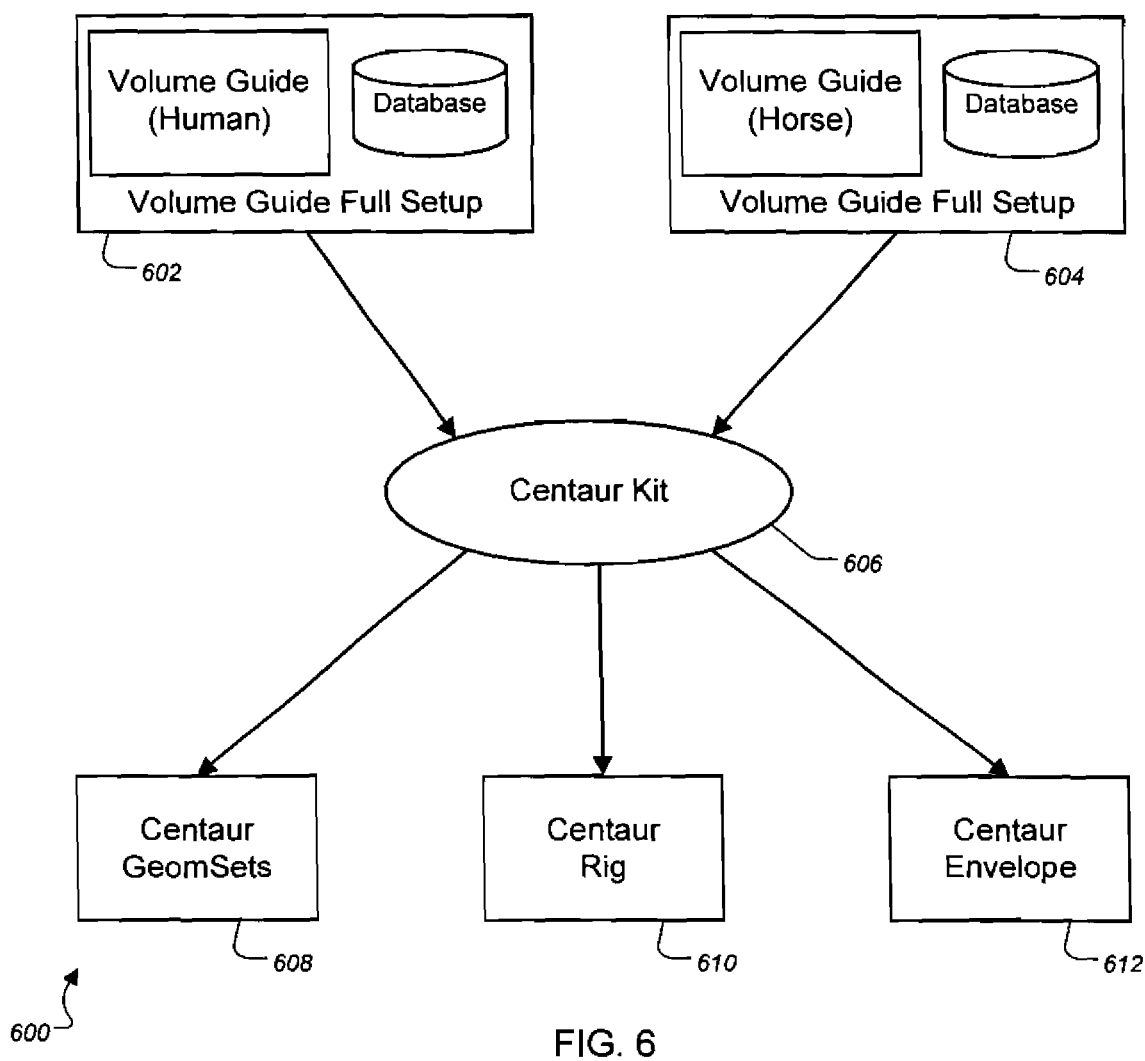
FIG. 6 shows an example of creating a centaur character from human and horse volume guides.

Blocks from different characters can be combined to create a new type of character. For example, the character components of a human and a horse can be combined to generate a centaur character. FIG. 6 shows an example of how the centaur can be created. A process 600 begins with the creation of a human volume guide 602 and a horse volume guide 604. Alternatively, already existing volume guides may be obtained from a database at this point. Then, each of the volume guides is shaped to fit the centaur character, for example such that it has the upper body of a human and the lower body of a horse. The system can then be instructed to create only the parts of the respective rigs that are needed for the centaur. For example, there may be omitted the legs of the human character and the head of the horse. The character components that are thus selected for the centaur may conveniently be collected in a centaur kit 606. Using those components, then, including the respective volume guides as applicable, there can be generated for the centaur one or more geomsets 608 and envelopes 612 (e.g., skin weights and muscles). These may be generated using any of the exemplary techniques that have been described above.

Some characters have a left-right symmetry to some degree. For example, characters of a human, gorilla, cat or centaur typically are at least in part left-right symmetric when viewed directly from the front. This symmetry means that there are vertices on the left side of the volume guide that are essentially identical to corresponding ones on the right side. This characteristic can be used to simplify character generation. Particularly, there may be generated a vertex map for the volume guide that correlates the equivalent vertices. Signposts may then be setup only for half of the creature, and then be mapped to the other side as appropriate. When a block of the character is to be drawn, the system may request the signposts needed by the block, map vertex indices accordingly, and use the signposts in generating the block. For example, if the signpost "arm_joint" is stored relative to vertices on the right side of the volume guide that have equivalents on the left side, the system may map the vertex indices using the vertex map to generate a list of vertices to use on the left side. This allows the same arm code to be used on both sides of a character, also when the character otherwise has significant left-right asymmetries.

The plug-and socket approach can also be used in implementations with characters that are at least partly symmetrical. For example, the arms can provide identical sockets at their lower ends to be connected with the plugs of respective hand blocks. To ensure that a specific hand block plugs into the correct arm (e.g., the right arm and not the left arm), the blocks can be organized separately for the various sides of the symmetry. With reference again to FIG. 2, the blocks 212 can be organized in a left side category 220a and a right side category 220b. For example, when the left wrist block is drawn, it may be placed in the left side category 220a. At rig assembly, the wrist block would first look within the left side category for the socket it needs. If there is a left arm block in the left side category, the corresponding wrist socket of that arm is identified and used in connecting the two blocks. By contrast, there may also exist a right arm block in the right side category that presents the same wrist socket as the left arm But because the system first seeks a matching socket within the category where the current block is located, there is no risk of the left wrist inadvertently connecting with the right arm, although that arm has the same wrist socket. In some implementations, if no matching plug or socket is found for a block in the same category, the search may be expanded to blocks outside of the category, including the opposite side category, for example. The categorization may be done in a way similar to a directory structure. For example, the blocks in the left side category, and their respective plugs and sockets, may be provided with corresponding paths to distinguish them from the right side components. Such a path may include adding an extension "/L" to the name or address of the left side components, and similarly "/R" for the right side. In some implementations, the categories 220 are included in the kit 218.

In some implementations, the blocks are construed in a flat hierarchy. This approach may be supplemented by what is here referred to as a welding technique, in which all of the individual blocks can be resolved into a single hierarchy. For example, each plug-socket relationship can be collapsed into a direct parent-child relationship. This may make it easier for animators to understand and use the components that make up each character. For example, when viewing the character components on a computer screen, the welding provides a single hierarchy that contains all the blocks for the present character, wherein the individual blocks are joined using the plugs and sockets, as described in earlier examples. The system may maintain a record of which blocks existed before the welding so that the creature can be unwelded if necessary, for example to make changes therein.

Figure 7:
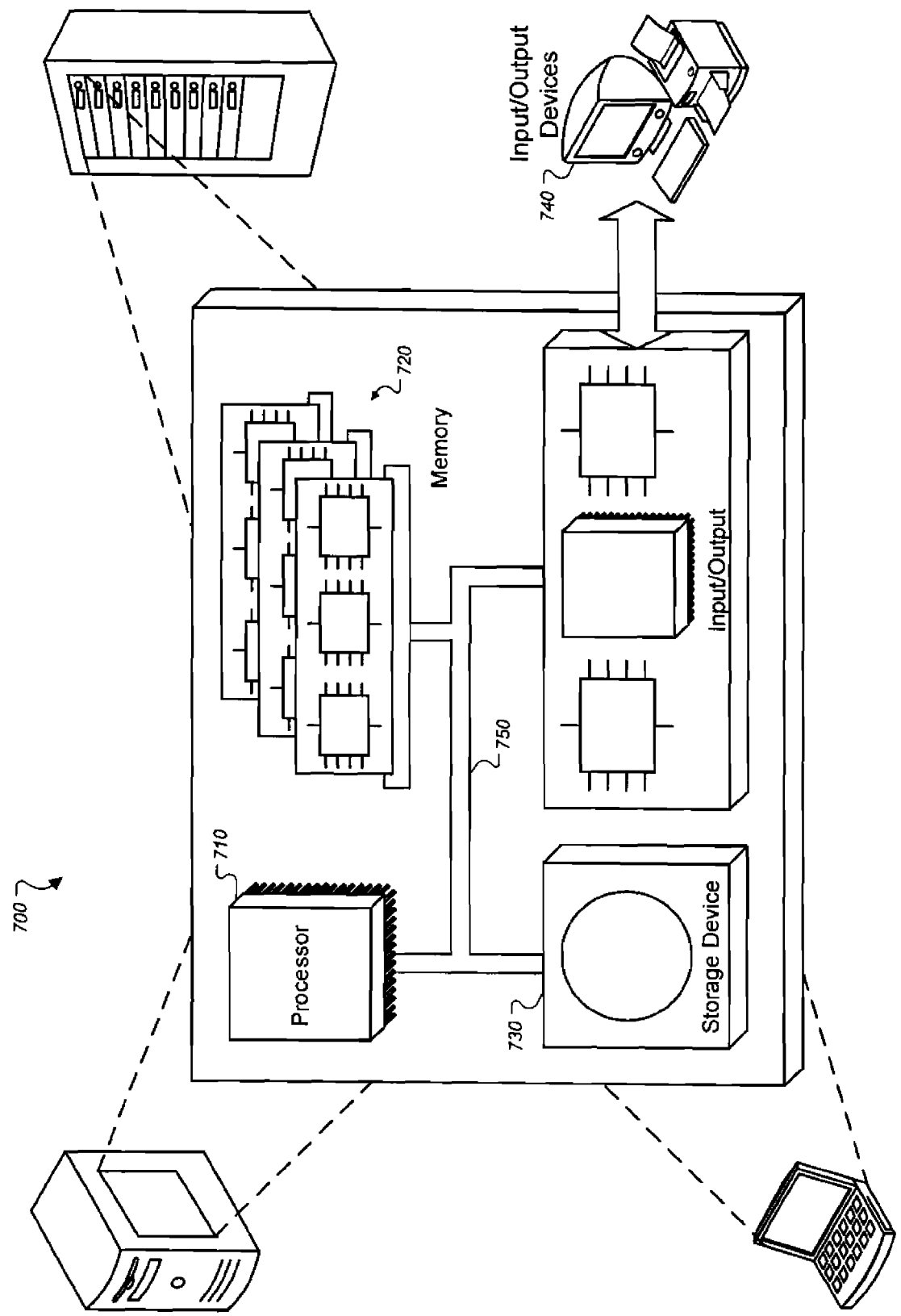
FIG. 7 is a block diagram of a computing system that can be used in connection with computer-implemented methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for creating a character for animation, the method comprising:
    associating spatial variables with a first three-dimensional mesh, wherein the first three-dimensional mesh specifies a shape of a first character and wherein the spatial variables have initial values that correspond to a position in three-dimensional space relative to one or more vertices on the first three-dimensional mesh;
    providing the first three-dimensional mesh with a modular rig structure comprising character components from a particular collection of character components, wherein the particular collection of character components is defined for use with the first three-dimensional mesh, and wherein each character component is associated with one or more of the spatial variables and a geomset, wherein the geomset represents at least one of a portion of skeletal geometry and animation information for the first three-dimensional mesh and associating each character component with a geomset specifies a configuration of the geomset with respect to the first three-dimensional mesh;
    modifying, using a computer system, the first three-dimensional mesh to generate a second three-dimensional mesh, wherein the second three-dimensional mesh specifies a shape of a second character;
    setting new values for the spatial variables for the second three-dimensional mesh that define a configuration of each of the character components in the modular rig structure for the second three-dimensional mesh, where the new values for the spatial variables are based on a difference in shape between the first three-dimensional mesh and the second-three dimensional mesh, wherein the new values for the spatial variables also define a configuration for the geomsets associated with the character components for the second three-dimensional mesh;
    automatically transforming the geomsets, in multiple progressive refinements, based at least in part on the new values for the spatial variables, wherein the transformed geomsets are adapted to the second three-dimensional mesh; and
    storing the character components and the transformed geomsets in a new collection of character components that is defined for use with the second three-dimensional mesh, including storing an association of the character components in the new collection of character components to one or more of the new values for the spatial variables.

2. The computer-implemented method of claim 1, further comprising:
    replacing at least one character component in the modular rig structure for the second three-dimensional mesh with a new character component from a collection of character components the correspond to a third three-dimensional mesh, wherein the new character component is associated with a geomset geometry for the third three-dimensional mesh and wherein the new values for the spatial variables define a configuration of the new character component in the modular rig structure for the second three-dimensional mesh; and
    transforming the geomset defining geometry for the third three-dimensional mesh, in multiple progressive refinements, based at least in part on the new values for the spatial variables, wherein the transformed geomset defines geometry for the second three-dimensional mesh.

3. The computer-implemented method of claim 1, wherein the multiple progressive refinements include at least two of:
    a first transformation based on the second three-dimensional mesh in its entirety;
    a second transformation based on a local region of the second three-dimensional mesh; and
    a third transformation on a vertex-by-vertex basis.

4. The computer-implemented method of claim 1, wherein the multiple progressive refinements include at least two of:
    a global scale match transformation correlated to the second three-dimensional mesh;
    a single transform for at least one geomset to relate the geomset to the second three-dimensional mesh; and
    a transformation matching at least one geomset to corresponding vertices on the second three-dimensional mesh.

5. The computer-implemented method of claim 4, wherein the transformation matching is performed, and wherein the transformation matching comprises a matching of rotation, translation and scale based on the vertices on the second three-dimensional mesh.

6. The computer-implemented method of claim 1, wherein the associating spatial variables with the first three-dimensional mesh and the providing the first three-dimensional mesh with a module rig structure comprising character components are performed before generating the second three-dimensional mesh.

7. The computer-implemented method of claim 1, wherein the geomsets define at least one of skin weighting or muscle representation.

8. The computer-implemented method of claim 1, wherein the geomsets initially correspond to at least one of the vertices on the first three-dimensional mesh.

9. The computer-implemented method of claim 1, wherein setting new values for the spatial variables for the second three-dimensional mesh comprises identifying, in the first three-dimensional mesh, those vertices with which each spatial variable is associated, obtaining new positions of the vertices in the second three-dimensional mesh, and setting the new values of the spatial variables using the new positions.

10. The computer-implemented method of claim 1, wherein setting new values for the spatial variables comprises deriving a transformation matrix using vertices on the first and second three-dimensional meshes and applying the transformation matrix to the spatial variables.

11. The computer-implemented method of claim 1, further comprising setting the new values for the spatial variables in multiple progressive refinements.

12. The computer-implemented method of claim 1, wherein each of the character components is associated with three functions that can be performed to define the configuration of the character components in the modular rig structure for the second three-dimensional mesh:
  (i) a first function that lists those of the spatial variables that are to be applied to the current character component for retrieving those spatial variables for the current character component;
  (ii) a second function that identifies at least one of the spatial variables associated with another one of the character components, wherein the current character component is to use the identified spatial variable in connecting to the other character component; and
  (iii) a third function that identifies at least one of the spatial variables associated with the current character component, wherein another one of the character components is to use the identified spatial variable in connecting to the current character component.

13. The computer-implemented method of claim 1, wherein the modular rig structure is modular due to the character components being configured to be associated in pairs using plug definitions and socket definitions associated with respective ones of the character components.

14. The computer-implemented method of claim 13, wherein the several character components are organized in a flat hierarchy, further comprising collapsing each plug-socket relationship into a direct relationship between those of the character components having the respective plug definitions and socket definitions.

15. The computer-implemented method of claim 13, wherein the plug and socket definitions include unique identifiers, and wherein a first one of the character components is to be connected to a second one of the character components only if a plug definition for the first character component has a common identifier with a socket definition for the second block character component.

16. The computer-implemented method of claim 15, wherein the first and second three-dimensional meshes are at least in part left-right symmetrical, further comprising organizing the character components in respective left side and right side categories.

17. The computer-implemented method of claim 16, wherein the first character component is organized in the right side category, and wherein seeking a match for the first character component comprises searching the right side category for another character component having the common identifier.

18. The computer-implemented method of claim 16, further comprising identifying vertices on a left side of the first three-dimensional mesh that are equivalent to vertices on a right side of the first three-dimensional mesh and using this equivalency when associating the spatial variables with the first three-dimensional mesh.

19. The computer-implemented method of claim 18, wherein using the equivalency comprises mapping the spatial variables associated with the first three-dimensional mesh for the equivalent vertices.

20. The computer-implemented method of claim 1, further comprising using the first and second three-dimensional meshes to create a combined three-dimensional mesh.

21. The computer-implemented method of claim 20, wherein each of the first and second three-dimensional meshes have a modular rig structure comprising character components, and wherein the combined three-dimensional mesh is created by obtaining selected character components from the respective modular rig structures and assembling the selected character components.

22. The computer-implemented method of claim 20, further comprising performing another progressive-refinement transformation in creating the combined three-dimensional mesh.

23. The computer-implemented method of claim 1, wherein each of the multiple progressive refinements comprises at least one of a scale transformation, a rotation and a translation.

24. The computer-implemented method of claim 23, wherein a first one of the progressive refinements comprises only the scale transformation.

25. The computer-implemented method of claim 1, wherein the geomsets are configured for use in collision detection.

26. A computer program product tangibly embodied in a non-transitory computer-readable medium and comprising instructions that when executed by a processor perform a method for creating a character for an animation, the method comprising:
  associating spatial variables with a first three-dimensional mesh, wherein the first three-dimensional mesh specifies a shape of a first character and wherein the spatial variables have initial values that correspond to a position in three-dimensional space relative to one or more vertices on the first three-dimensional mesh;
  providing the first three-dimensional mesh with a modular rig structure comprising character components from a particular collection of character components, wherein the particular collection of character components is defined for use with the first three-dimensional mesh, and wherein each character component is associated with one or more of the spatial variables and a geomset, wherein the geomset represents at least one of a portion of skeletal geometry and animation information for the first three-dimensional mesh and associating each character component with a geomset specifies a configuration of the geomset with respect to the first three-dimensional mesh;

modifying, using a computer system, the first three-dimensional mesh to generate a second three-dimensional mesh, wherein the second three-dimensional mesh specifies a shape of a second character;

setting new values for the spatial variables for the second three-dimensional mesh that define a configuration of each of the character components in the modular rig structure for the second three-dimensional mesh, where the new values for the spatial variables are based on a difference in shape between the first three-dimensional mesh and the second-three dimensional mesh, wherein the new values for the spatial variables also define a configuration for the geomsets associated with the character components for the second three-dimensional mesh;

transforming the geomsets, in multiple progressive refinements, based at least in part on the new values for the spatial variables, wherein the transformed geomsets are adapted to the second three-dimensional mesh; and storing the character components and the transformed geomsets in a new collection of character components that is defined for use with the second three-dimensional mesh, including storing an association of the character components in the new collection of character components to one or more of the new values for the spatial variables.

27. A system for creating a character for an animation, the system comprising:

a processor; and a computer readable storage medium comprising instructions that when executed by the processor cause the system to generate:

a character component management module configured to:

associate spatial variables with a first three-dimensional mesh, wherein the first three-dimensional mesh specifies a shape of a first character and wherein the spatial variables have initial values that correspond to a position in three-dimensional space relative to one or more vertices on the first three-dimensional mesh;

provide the first three-dimensional mesh with a modular rig structure comprising character components from a particular collection of character components, wherein the particular collection of character components is defined for use with the first three-dimensional mesh, and wherein each character component is associated with one or more of the spatial variables and a geomset, wherein the geomset represents at least one of a portion of skeletal geometry and animation information for the first three-dimensional mesh and associating each character component with a geomset specifies a configuration of the geomset with respect to the first three-dimensional mesh; and modify, using a computer system, the first three-dimensional mesh to generate a second three-dimensional mesh, wherein the second three-dimensional mesh specifies a shape of a second character; and a transforming module configured to:

set new values for the spatial variables for the second three-dimensional mesh that define a configuration of each of the character components in the modular rig structure for the second three-dimensional mesh, where the new values for the spatial variables are based on a difference in shape between the first three-dimensional mesh and the second-three dimensional mesh, wherein the new values for the spatial variables also define a a configuration for the geomsets associated with the character components for the second three-dimensional mesh;

transform the geomsets, in multiple progressive refinements, based at least in part on the new values for the spatial variables, wherein the transformed geomsets are adapted to the second three-dimensional mesh; and store the character components and the transformed geomsets in a new collection of character components that is defined for use with the second three-dimensional mesh, including storing an association of the character components in the new collection of character components to one or more of the new values for the spatial variables.

* * * * *

UNITED STATES PATENT AND TRADEMARK OFFICE
CERTIFICATE OF CORRECTION

PATENT NO. : 8,477,140 B2  
APPLICATION NO. : 11/738714  
DATED : July 2, 2013  
INVENTOR(S) : Jason Smith et al.

Page 1 of 1

It is certified that error appears in the above-identified patent and that said Letters Patent is hereby corrected as shown below:

Title Page, item 75, Inventors:
   delete: "Jeff White, San Rafael, CA (US)"
   replace with: "Jeff White, Portland, OR (US)"

In the Claims, Col. 18, Line 28:
   delete: "...spatial variables also define a a configuration..."
   replace with: "...spatial variables also define a configuration..."

Signed and Sealed this
Tenth Day of September, 2013

Teresa Stanek Rea
*Acting Director of the United States Patent and Trademark Office*